United States Patent [19]
Reidetschläger et al.

[11] Patent Number: 6,143,053
[45] Date of Patent: Nov. 7, 2000

[54] PROCESS FOR PRODUCING SPONGE IRON BY DIRECT REDUCTION OF IRON-OXIDE-CONTAINING MATERIAL

[75] Inventors: Johann Reidetschläger, Linz; Siegfried Zeller, Leonding; Felix Wallner, Linz, all of Austria; Roy Hubert Whipp, Jr., Windermere, Fla.

[73] Assignee: Voest-Alpine Industrieanlagenbau GmbH, Linz, Austria

[21] Appl. No.: 09/101,292

[22] PCT Filed: Nov. 5, 1997

[86] PCT No.: PCT/AT97/00236
§ 371 Date: Sep. 30, 1998
§ 102(e) Date: Sep. 30, 1998

[87] PCT Pub. No.: WO98/20171
PCT Pub. Date: May 14, 1998

[30] Foreign Application Priority Data

Nov. 6, 1996 [AT] Austria .................................. 1933/96

[51] Int. Cl.⁷ .................................................. C21B 13/00
[52] U.S. Cl. ............................ 75/444; 75/450; 423/439
[58] Field of Search ............................ 75/450, 505, 444; 423/439

[56] References Cited

U.S. PATENT DOCUMENTS

| | | |
|---|---|---|
| Re. 32,247 | 9/1986 | Stephens, Jr. . |
| 2,752,234 | 6/1956 | Shipley . |
| 4,053,301 | 10/1977 | Stephens, Jr. . |
| 5,082,251 | 1/1992 | Whipp . |
| 5,118,479 | 6/1992 | Stephens, Jr. et al. .................. 423/439 |
| 5,137,566 | 8/1992 | Stephens, Jr. et al. . |
| 5,437,708 | 8/1995 | Meissner et al. . |
| 5,618,032 | 4/1997 | Meissner et al. ........................ 423/439 |
| 5,858,058 | 1/1999 | Kern et al. ................................ 75/450 |

FOREIGN PATENT DOCUMENTS

| | | |
|---|---|---|
| 0179734 | 4/1986 | European Pat. Off. . |
| 0209861 | 1/1987 | European Pat. Off. . |
| 0571358 | 11/1993 | European Pat. Off. . |
| 2375327 | 7/1978 | France . |
| 2405898 | 9/1974 | Germany . |
| 4426623 | 7/1995 | Germany . |
| 9314228 | 7/1993 | WIPO . |
| 9600302 | 1/1996 | WIPO . |
| 9600304 | 1/1996 | WIPO . |

*Primary Examiner*—Melvyn Andrews
*Attorney, Agent, or Firm*—Birch, Stewart, Birch & Kolasch LLP

[57] ABSTRACT

In a process for producing sponge iron by direct reduction of iron-oxide-containing material, synthesis gas is mixed with top gas forming in the direct reduction of the iron-oxide-containing material and is utilized as a CO- and $H_2$-containing reducing gas for direct reduction and for heating the iron-oxide-containing material to a reduction temperature. To be able to save energy in an economically efficient manner when producing steel, especially in the refining process, direct reduction is carried out as follows: (1) in addition to the reducing gas, a carbon-containing gas, such as natural gas, or a gas having higher hydrocarbons is utilized for reduction; (2) the iron-oxide-containing material for a predetermined period of time exceeding the period necessary for complete reduction is exposed to the reducing gas and to the additionally supplied carbon-containing gas, and (3) a $CO/CO_2$ ratio ranging between 2 and 5, preferably a ratio in excess of 2.5, is adjusted in the reducing gas.

19 Claims, 1 Drawing Sheet

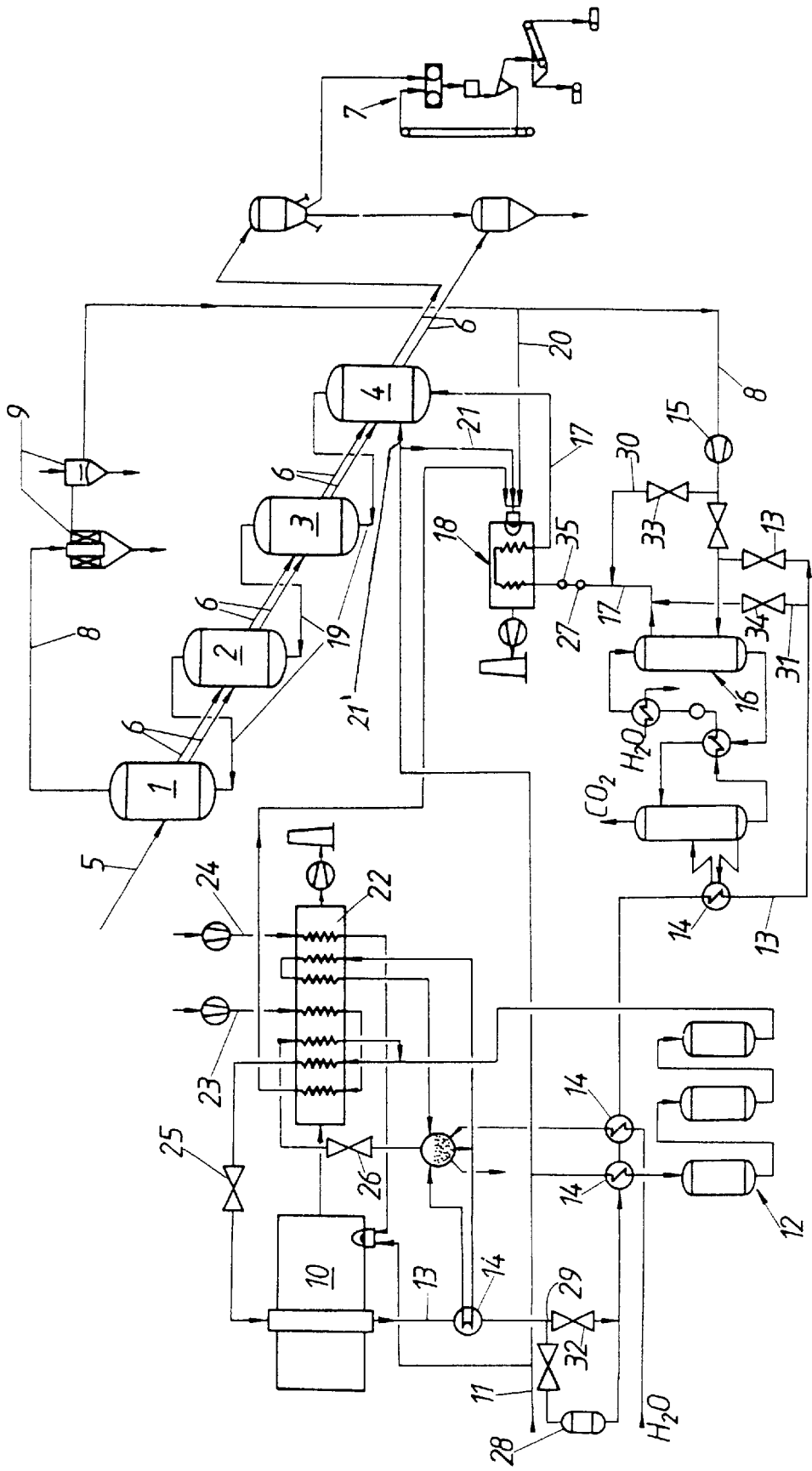

PROCESS FOR PRODUCING SPONGE IRON BY DIRECT REDUCTION OF IRON-OXIDE-CONTAINING MATERIAL

This application claims the benefit under 35 U.S.C. §371 of prior PCT International Application No. PCT/AT97/00236 which has an International filing date of Nov. 5, 1997 which designated the United States of America, the entire contents of which are hereby incorporated by reference.

BACKGROUND OF THE INVENTION

The invention relates to a process for producing sponge iron by direct reduction of iron-oxide-containing material, wherein synthesis gas, preferably reformed natural gas, is mixed with top gas forming in the direct reduction of the iron-oxide-containing material and is utilized as a CO- and $H_2$-containing reducing gas for direct reduction and for heating the iron-oxide-containing material to a reduction temperature.

PRIOR ART

A process of this type is known, for instance, from U.S. Pat. No. 2,752,234, U.S. Pat. No. 5,082,251 and EP-A-0 571 358, WO 96/00304 and DE-B-24 05 898.

From EP-A-0 571 358 it is known to carry out the reduction of fine ore not exclusively via the strongly endothermic reaction with $H_2$ according to

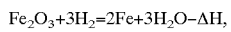

but additionally via the reaction with CO according to

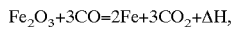

which is an exothermic reaction. Thereby, it is feasible to considerably lower the operational costs, in particular the energy costs, involved.

The sponge iron produced by directly reducing iron-oxide-containing material according to this prior art as a rule has a carbon content amounting to between 1 and 1.5%. Yet, for further processing the sponge iron, an elevated carbon content is advantageous, so as to be able to save energy when melting the sponge iron and in the subsequent refining process, without the need for a separate addition of carbon (carburization).

The invention therefore has as its object to modify a process in accordance with the initially described kind in such a manner that the sponge iron will exhibit an elevated carbon content, preferably of a dimension between 2 and 4%, particularly in excess of 2.5%. However, this is to be enabled by only a slightly—if at all—elevated expenditure in terms of energy, so that compared to conventional processes for producing sponge iron only slight additional costs will incur and the savings in energy arising in the refining process will not be compensated but will have the most complete effect possible on the economic efficiency of the steel or steel prematerial production process.

In accordance with the invention, this object is achieved by the combination of the following characteristic features:
  in addition to the reducing gas, a carbon-containing gas, such as natural gas, or a gas having higher hydrocarbons is utilized for reduction
  the iron-oxide-containing material for a predetermined period of time exceeding the period necessary for complete reduction is exposed to the reducing gas and to the additionally supplied carbon-containing gas, and
  a $CO/CO_2$ ratio ranging between 2 and 5, preferably a ratio in excess of 2.5, and in particular a ratio in ecxess of 3, is adjusted in the reducing gas.

From WO 96/00304 it is known to reduce or prevent "metal dusting" by adjusting a specific $CO/CO_2$ ratio, namely in a range between 1 and 3, but aiming at a range between 1.5 and 2, which per se does not contribute towards achieving the object of the invention.

The production of sponge iron having a carbon content of between 0.5 and 2.5% is already known from WO-A-93/14228; more specifically, with this known process, small amounts of natural gas are employed for adjusting the carbon, wherein the natural gas is charged directly into a fluidized bed reactor. But this measure alone is not very efficient, since complete decomposition of the natural gas is not assured at the reduction temperatures envisaged for direct reduction.

From U.S. Pat. No. 5,137,566 it is known to produce highly concentrated iron carbide from iron ore by means of reducing gas and carburizing gas, wherein on account of the time sensitiv nature of the iron carbide formation process, a higher residence time is aimed at for the conversion. The mere increase in the residence time of the iron-oxide-containing material in direct reduction causes a considerable decrease in terms of production, i.e. a substantially reduced output of reduced material per time unit. This method therefore involves fairly great expenditures and, accordingly, the iron carbide thus produced is utilized in steelmaking processes only by way of an addition, whereas the object to be achieved in accordance with the invention is that all of the sponge iron utilized for making steel is to have an elevated carbon content, i.e. the sponge iron of elevated carbon content that is thus produced is not just used as an addition in a steelmaking operation but itself constitutes the base material for it.

A process of this kind is also known from U.S. Pat. No. 5,437,708. Here, iron carbide is produced in a direct reduction shaft furnace by means of a reducing gas. Here, too, the prolonged residence time of the iron-oxide-containing material in the reduction reactor is a disadvantage of the process. The residence time is in the range of 9 to 15 hours, which—as has already been stated—leads to a substantial decrease in production.

From U.S. Pat. No. Re-32,247 it is known to convert iron-oxide-containing material to iron carbide in a first step and to directly produce steel from the iron carbide in a second step. With this known method, an hydrogen-containing reducing gas is employed for reduction, and a carbon-containing material for the formation of iron carbide. One disadvantage associated with this method is the complete conversion of the iron to iron carbide, which likewise entails great expenditures in terms of energy (substantial consumption of carbon-containing material in direct reduction).

DESCRIPTION OF THE INVENTION

According to the invention, in addition to the reducing gas higher hydrocarbons, $C_3H_8$ and upwards, are utilized as an additional carbon-containing gas for direct reduction, the advantage being that hydrocarbons of this type will easily decompose even at relatively low temperatures and hence will develop their full effect in the formation of an elevated carbon content. In accordance with the invention, slight amounts of such hydrocarbons provided in addition to the reducing gas will already suffice.

Preferably, the process according to the invention is carried out in that direct reduction is effected in two or several subsequently connected fluidized bed reactors and the natural gas or the higher hydrocarbons are conducted into the fluidized bed reactor arranged last in the direction of flow of the iron-oxide-containing material and that they pass through the said reactor and, subsequently, through the other fluidized bed reactors in counterflow to the iron-oxide-containing material. This results in a particularly high efficiency of the measures that are to be carried out in combination, so that in spite of the increase in the time period during which the iron-oxide-containing material is exposed to the reducing gas there is hardly any decrease in production.

The increase in the time period for directly reducing the iron-oxide-containing material may according to a preferred variant be realized by carrying out direct reduction in at least one fluidized bed reactor, with the bed height of the fluidized bed being adjusted to be higher than the minimum bed height required to attain complete reduction of the iron-oxide-containing material, so that the material that is to be reduced is exposed to the reducing gas and to the additionally supplied carbon-containing gas in excess of the time required for complete reduction, or may also be effected in that the throughput in direct reduction is reduced as compared to the minimum throughput required for complete reduction of the iron-oxide-containing material.

Another measure that is advantageous to the process according to the invention is characterized in that reduction is carried out with a specific amount of reducing gas, which is elevated as compared to the specific minimum amount of gas required for complete reduction of the iron-oxide-containing material.

An essential process step for increasing the carbon content of the sponge iron is to effect the $CO/CO_2$ ratio by adjusting the operational characteristics of a reformer serving for producing the synthesis gas from natural gas in a reforming operation by varying the vapor to natural gas ratio in the feeding of the reformer, wherein suitably the vapor to natural gas ratio is adjusted to fall within the range from 3 to 4.5, especially to be at a value of about 3.5.

DESCRIPTION OF PREFERRED EMBODIMENTS

Preferably, the $CO/CO_2$ ratio is adjusted in that a partial volume of the reformed gas produced from vapor and natural gas in a reformer and subsequently supplied to CO conversion in order to increase the $H_2$ content is admixed to the top gas directly, i.e. without being subjected to CO conversion, with the amount of reformed gas being admixed directly being variable.

Another preferred embodiment is characterized in that both the reformed gas and the top gas prior to being utilized as a reducing gas are subjected to $CO_2$ elimination, preferably to $CO_2$ scrubbing, and that adjustment of the $CO/CO_2$ ratio is effected by at least a partial volume of the reformed gas being admixed to the reducing gas directly, avoiding $CO_2$ elimination.

Adjustment of the $CO/CO_2$ ratio can also be effected by subjecting both the reformed gas and the top gas to $CO_2$ elimination, preferably to $CO_2$ scrubbing, adjustment of the $CO/CO_2$ ratio being effected by directly admixing at least a partial volume of the top gas to the reducing gas directly, avoiding $CO_2$ elimination. It is also feasible to vary the degree of elimination of $CO_2$, namely in such a manner that a portion of the $CO_2$ will remain in the gas that is to be purified.

Preferably, the residence time of the iron-oxide-containing material is extended to 40 to 80 min, preferably to 40 to 60 min.

For adjusting a specific carbon content of the sponge iron, the $H_2S$ content of the reducing gas preferably may also be used.

BRIEF DESCRIPTION OF THE DRAWING

In the following, the process according to the invention will be explained in more detail by way of the drawing illustrating a process diagram according to a preferred embodiment.

The drawing is a schematic diagram showing a preferred embodiment of the invention.

DETAILED DESCRIPTION OF THE INVENTION

The plant for carrying out the process according to the invention is illustrated by the drawing which comprises four fluidized bed reactors 1 to 4 consecutively connected in series, wherein iron-oxide-containing material, such as fine ore, through an ore supply duct 5 is supplied to the first fluidized bed reactor 1, in which heating to reduction temperature (or prereduction) takes place, and subsequently is conducted from fluidized bed reactor to fluidized bed reactor via conveying ducts 6. The completely reduced material (sponge iron) is hot-briquetted in a briquetting arrangement 7. If required, the reduced iron is protected from re-oxidation during briquetting by an inert gas system not illustrated.

Prior to introducing the fine ore into the first fluidized bed reactor 1, it is subjected to ore preparation, such as drying and sieving, not illustrated in detail.

Reducing gas is conducted in counterflow to the ore flow from fluidized bed reactor 4 to fluidized bed reactor 3 to 1 and is carried off the fluidized bed reactor 1 arranged last if viewed in the gas flow direction as a top gas through a top-gas discharge duct 8 and is cooled and scrubbed in a wet scrubber 9.

The production of reducing gas is effected by reforming in a reformer 10 natural gas fed through a duct 11 and desulfurized in a desulfurization plant 12. The gas leaving the reformer 10 and formed of natural gas and vapor essentially consists of $H_2$, CO, $CH_4$, $H_2O$ and $CO_2$. This reformed natural gas through a reformed-gas duct 13 is supplied to several heat exchangers 14, in which it is cooled to 80 to 150° C., water thus being condensed out of the gas.

The reformed-gas duct 13 runs into the top-gas discharge duct 8 after the top gas has been compressed by means of a compressor 15. The mixed gas thus forming is passed through a $CO_2$ scrubber 16 and is freed from $CO_2$ and at the same time also from $H_2S$. Instead of the $CO_2$ scrubber, it is also feasible to provide a different kind of $CO_2$ removal plant, for instance a pressure-swing adsorption plant. The mixed gas is then available as a reducing gas. This reducing gas via a reducing-gas feed duct 17 is heated to a reducing-gas temperature of about 800° C. in a gas heater 18 connected downstream of the $CO_2$ scrubber 16 and is fed to the fluidized bed reactor 4 arranged first in the gas flow direction, where it reacts with the fine ores to produce directly reduced iron. The fluidized bed reactors 4 to 1 are connected in series; the reducing gas passes from fluidized bed reactor to fluidized bed reactor through connection ducts 19, namely in counterflow to the iron-oxide-containing material.

A portion of the top gas is sluiced out of the gas circulatory system 8, 17, 19 in order to avoid enrichment of inert gases, such as $N_2$. The sluiced-out top gas through a branch duct 20 is fed to the gas heater 18 for heating the reducing gas and is burnt there. Possible shortages of energy are supplemented by natural gas supplied through the feed duct 21.

The sensible heat of the reformed natural gas emerging from the reformer 10 as well as of the reformer smoke gases is utilized in a recuperator 22 to preheat the natural gas after passage through the desulfurization plant 12, to produce the vapor required for reformation and to preheat the combustion air supplied to the gas heater 18 through duct 23 and, if desired, also the reducing gas. The combustion air supplied to the reformer 10 through duct 24 is preheated as well.

As one of the key measures taken in order to increase the carbon content in the sponge iron, there is adjusted a predetermined $CO/CO_2$ ratio, namely in the range between 2 and 5, preferably in the range between 2 and 3. In accordance with the invention, according to a first variant thereof, this is achieved by varying the vapor to natural gas ratio of the feeding to the reformer 10, the vapor to natural gas ratio preferably being adjusted to a value ranging between 3 and 4.5, in particular to a value of 3.5. The adjustment valves or control valves serving this purpose are denoted 25 and 26 and are adjustable or controllable, respectively, from a measuring station 27 measuring the $CO/CO_2$ ratio of the reducing gas.

As is apparent from the drawing, the reformed gas, at least at a partial volume thereof, is supplied to a CO converter 28 to increase the $H_2$ content before being supplied to $CO_2$ scrubbing at 16. The remaining partial volume of the reformed gas is directly admixed to the top gas by bypassing the CO converter 28 via a bypass duct 29. Thereby, it is feasible to adjust the CO content to a desired value such that the desired $CO/CO_2$ ratio may be adjusted also by this procedural measure to increase the carbon content.

Furthermore, the adjustment of a predetermined $CO/CO_2$ ratio may be effected by injecting a partial volume of the top gas directly into the reducing-gas supply duct 17 through a bypass duct 30 avoiding the $CO_2$ scrubber 16. Moreover, a partial volume of the reformed gas also may be directly fed to the reducing-gas supply duct 17 through a bypass duct 31 bypassing the $CO_2$ scrubber 16, which bypass duct 31 in that case departs from the reformed-gas duct 13.

All of the bypass ducts 29, 30, 31 are equipped with adjustment or control valves 32, 33, 34 to be adjusted or controlled on the basis of a measurement of the $CO/CO_2$ ratio of the reducing gas taken by means of the measuring station 27.

The desired $CO/CO_2$ ratio in the reducing gas also may be adjusted by passing all of the top gas and all of the reformed gas through the $CO_2$ scrubber 16, yet adjusting the latter to a wash-out level at which a portion of the $CO_2$ (and hence also a portion of the $H_2S$) will remain in the gas emerging from the $CO_2$ scrubber 16. This has the advantage that no auxiliary means, such as bypass ducts 29, 30, 31 including valves 32, 33, 34, have to be provided, yet requires the total gas amount, i.e., all of the top gas and all of the reformed gas, to be passed through the $CO_2$ scrubber 16, the latter thus having to be dimensioned for such an amount.

The top gas leaving the fluidized bed reactor 1 has an $H_2S$ content ranging between 40 and 140 ppmV—depending on the sulfur content of the ore. The $H_2S$ gas forms during heating of the fine ore to reduction temperature or during the prereduction of the fine ore, respectively.

Since an elevated $H_2S$ content in the reducing gas also contributes to the increase in carbon content of the sponge iron, it is particularly advantageous if $H_2S$ no longer is completely washed out of the top gas by means of the $CO_2$ scrubber, but if it is taken care that the percentage of $H_2S$ desired for the reducing gas be fed to the reducing gas from the top gas. In the instant case, this can be realized by means of the bypass duct 30 bypassing the $CO_2$ scrubber 16, which bypass duct departs from the top-gas discharge duct 8 via the adjustment or control valve 33 and runs into the reducing-gas supply duct 17. The control valve 33 is adjustable in a manner that an $H_2S$ content ranging from 20 to 40 ppmV, preferably amounting to about 25 ppmV, is present in the reducing gas. In that case, the control valve preferably is activated via an $H_2S$ measuring means 35.

The measures described above for adjusting the desired $CO/CO_2$ ratio in the reducing gas may be taken individually or also several of them or all in common in a manner that the most favorable process variant can be selected for the respective operating conditions and as a function of the composition of the ore, etc.

According to the invention, adjustment of the $CO/CO_2$ ratio is applied in combination with the additional feeding of a carbon-containing gas such as natural gas or, better, hydrocarbons from $C_3H_8$ upwards, into the fluidized bed reactors in addition to the reducing gas as well as with an increase in the time period during which the iron-oxide-containing material is exposed to the reducing gas during direct reduction.

The additionally supplied carbon-containing gas can be admixed to the reducing gas prior to feeding it into the fluidized bed reactor 4 arranged last in the direction of flow of the iron-oxide-containing material or it is charged to the fluidized bed reactor 4 via a separate duct 21', as is illustrated in the FIGURE.

The increase in the time period during which the iron-oxide-containing material is exposed to the reducing gas as well as to the additionally supplied carbon-containing gas can be dimensioned as a function of the final carbon content desired for the sponge iron. In any event, the iron-oxide-containing material will be exposed to the reducing gas as well as to the additionally supplied carbon-containing gas in excess of the time required for complete reduction.

In the following example the invention is illustrated without intending to limit the scope of the invention in any way.

EXAMPLE I 100 t/h of dried fine ore are charged into a plant for the direct reduction of fine ore configured in accordance with the above description and designed for a production of 70 t/h of sponge iron. The fine ore has the following analysis:

| | |
|---|---|
| Hematite | 94.2% |
| Gangue | 2.2% |
| Sulfur | 0.02% |

From the top gas forming in the direct reduction, 79,000 $Nm^3/h$ are mixed with 54,000 $Nm^3/h$ of reformed cold natural gas and passed through the $CO_2$ scrubber 16, in which the mixed gas is freed from $CO_2$ and the major portion of sulfur.

The reformed natural gas and the top gas have the chemical compositions indicated in the Table below (vol.%).

| | Reformed Natural Gas | Top Gas |
|---|---|---|
| $CH_4$ | 3.0 | 31.7 |
| CO | 10.5 | 6.1 |

-continued

|  | Reformed Natural Gas | Top Gas |
|---|---|---|
| $CO_2$ | 10.0 | 6.0 |
| $H_2$ | 63.0 | 51.8 |
| $H_2O$ | 13.5 | 0.70 |
| $N_2$ | 0.0 | 3.70 |
| $H_2S$ | 0.0 | 78.0 ppmV |

The temperature of the reformed natural gas is 120° C., that of the top gas 100° C. The gas mixture emerging from the $CO_2$ scrubber 16 is supplied to the direct cooler 25 and cooled to a temperature of 68° C. The cooled gas mixture has the following composition:

| $CH_4$ | 21.8 |
|---|---|
| CO | 9.8 |
| $CO_2$ | 1.3 |
| $H_2$ | 63.0 |
| $H_2O$ | 1.7 |
| $N_2$ | 2.4 |
| $H_2S$ | 5 ppmV |

This gas mixture is mixed with 79,000 Nm³/h of top gas that has not been passed through the $CO_2$ scrubber 16 but has been injected into the reducing-gas supply duct 17 through bypass duct 26. Such mixing produces the reducing gas fed to the gas heater 18 and subsequently to the fluidized bed reactors 1 to 4, which reducing gas has a temperature of 75° C. and the following chemical composition:

| Reducing Gas | |
|---|---|
| $CH_4$ | 25.2 |
| CO | 8.0 |
| $CO_2$ | 2.9 |
| $H_2$ | 59.7 |
| $H_2O$ | 1.4 |
| $N_2$ | 2.8 |
| $H_2S$ | 30 ppmV |

In addition, natural gas in an amount of 3,400 Nm³/h is fed into the fluidized bed reactor 4 via the duct 21'.

The residence time in the lowermost fluidized bed reactor 4 is about 40 min.

The degree of metallization ($Fe_{met}/Fe_{tot}$) of the sponge iron is about 92%, the C content is about 2.5%, maximally 5%.

EXAMPLE II

By means of the following Table, the production in accordance with the prior art of sponge iron having 1.1% carbon is compared with the production of sponge iron having an elevated carbon content of 2.5%.

| Ore Composition | | Product Composition Wt. % | | Reducing Gas Composition Vol. % | | |
|---|---|---|---|---|---|---|
| Wt. % | | 1.1% C | 2.5% C | | 1.1% C | 2.5% C |
| $Fe_{TOTAL}$ | 65.57 | 93.41 | 89.83 | $H_2$ | 63.34 | 60.46 |
| $Fe_2O_3$ | 93.75 | 1.62 | 3.26 | CO | 6.81 | 6.32 |
| FeO | 0 | 9.64 | 11.6 | $H_2O$ | 1.48 | 1.4 |
| Fe | 0 | 84.79 | 80.87 | $CO_2$ | 3.38 | 2.67 |
| Gangue | 1.8 | 2.68 | 1.6 | $CH_4$ | 21.8 | 25.27 |
| C | 0 | 1.1 | 2.5 | $N_2$ | 3.19 | 3.9 |
| MgO | 0.00 | 0.15 | 0.15 | | | |
| S | 0.02 | 0.02 | 0.02 | | | |

In order to produce the sponge iron having 1.1% C, no natural gas is charged to the lowermost fluidized bed reactor 4, and for producing the sponge iron of 2.5% C, natural gas in an amount of 3,400 Nm³/h. The residence time in the lowermost fluidized bed reactor 4 is 33 min for the low-carbon sponge iron, and 37.5 min for the sponge iron of elevated carbon content. The $CO/CO_2$ ratio is 2 in the first instance and 2.4 in the second instance. The natural gas employed in producing the reducing gas is of the chemical composition indicated in the following Table:

| Natural Gas | Vol. % |
|---|---|
| $CH_4$ | 81.42 |
| $C_2H_6$ | 7.75 |
| $C_3H_8$ | 1.9 |
| $CO_2$ | 7.78 |
| $C_4$ | 1.15 |

What is claimed is:

1. Process for producing sponge iron by direct reduction in a fluidized bed of iron-oxide-containing material, wherein synthesis gas is mixed with top gas forming in the direct reduction of the iron-oxide-containing material to produce a mixture of CO- and $H_2$-containing reducing gas for direct reduction and for heating the iron-oxide-containing material to a reduction temperature, and wherein
  (a) in addition to the reducing gas, a carbon-containing gas for reduction is mixed with the reducing gas of the iron-oxide;
  (b) the iron-oxide-containing material for a time until after complete reduction is exposed to the reducing gas and to the additionally supplied carbon-containing gas;
  (c) a $CO/CO_2$ ratio ranging between 2 and 5 is adjusted and maintained in the reducing gas.

2. Process according to claim 1, further comprising addition to the reducing gas of higher hydrocarbons, $C_2H_8$ and upwards, for direct reduction.

3. Process according to claim 1, further comprising the features (a) direct reduction is carried out in a plurality of subsequently connected fluidized bed reactors, and (b) the higher hydrocarbons are conducted into the fluidized bed reactor arranged last in the direction of flow of the iron-oxide-containing material, and (c) the hydrocarbons pass through the said reactor and, subsequently, through the other fluidized bed reactors in counterflow to the iron-oxide-containing material.

4. Process according to claim 1 further comprising the feature that direct reduction is carried out in at least one fluidized bed reactor, with the bed height of the fluidized bed being adjusted to be higher than the minimum bed height required to attain complete reduction of the iron-oxide-containing material, so that the material that is to be reduced is exposed to the reducing gas and to the additionally supplied carbon containing gas in excess of the time required for complete reduction.

5. Process according to claim 1 further comprising the feature that the throughput in direct reduction is reduced so as to be less than the minimum throughput required for complete reduction of the iron-oxide-containing material.

6. Process according to claim 1 further comprising the feature that reduction is carried out with an amount of reducing gas, which is more than the minimum amount of gas required for complete reduction of the iron-oxide-containing material.

7. Process according to claim 1 further comprising the feature that the $CO/CO_2$ ratio is controlled in a reformer for producing the synthesis gas from natural gas by varying the vapor to natural gas ratio in the feeding of the reformer.

8. Process according to claim 7 further comprising the feature that the vapor to natural gas ratio is adjusted to fall within the range from 3 to 4.5.

9. Process according to claim 1 further comprising the feature that the $CO/CO_2$ ratio is adjusted in that a partial volume of the reformed gas produced from vapor and natural gas in the reformer producing the synthesis gas and subsequently supplied to CO conversion in order to increase the $H_2$ content is admixed to the top gas directly without being subjected to CO conversion, with the amount of reformed gas being admixed directly being variable.

10. Process according to claim 1 further comprising the feature (a) that both the reformed gas and the top gas prior to being utilized as a reducing gas are subjected to $CO_2$ elimination, and (b) that adjustment of the $CO/CO_2$ ratio is being effected by directly admixing at least a partial volume of the top gas to the reducing gas directly, and avoiding $CO_2$ elimination.

11. Process according to claim 1 further comprising the feature that both the reformed gas and the top gas are subjected to $CO_2$ scrubbing, adjustment of the $CO/CO_2$ ratio being effected by directly admixing at least a partial volume of the top gas to the reducing gas directly, and avoiding $CO_2$ elimination.

12. Process according to claim 1 further comprising the feature that both the reformed gas and the top gas reducing the iron-oxide are subjected to $CO_2$ scrubbing, adjustment of the $CO/CO_2$ ratio being effected by varying the amount of $CO_2$ eliminated by scrubbing in such a manner that a portion of the $CO_2$ remains in the gas that is to be purified.

13. Process according to claim 1 further comprising the feature that the residence time of the iron-oxide-containing material is extended to 40 to 80 min.

14. Process according to claim 1 further comprising the feature that when $H_2S$ is present in the reducing gas adjustment of a specific content of C in the sponge iron is effected by adjusting the content of $H_{2S}$ in the reducing gas.

15. Process according to claim 1 further comprising the feature that a $CO/CO_2$ ratio in excess of 3 is adjusted in the reducing gas.

16. Process according to claim 1, wherein the $CO/CO_2$ ratio is in excess of 1.5.

17. Process according to claim 7, wherein the vapor to natural gas ratio is adjusted to be at a value of about 3.5.

18. Process according to claim 10, wherein $CO_2$ is eliminated from the reducing gas by $CO_2$ scrubbing.

19. Process according to claim 13, wherein the residence time of the iron-oxide containing material is 40 to 60 min.

* * * * *